(12) United States Patent
Davies et al.

(10) Patent No.: US 8,042,417 B2
(45) Date of Patent: Oct. 25, 2011

(54) ACTUATOR

(75) Inventors: Stephen Harlow Davies, Shifnal (GB); John Herbert Harvey, Wolverhampton (GB); Steven Blakemore, Wolverhampton (GB); Edward George Hill, Redditch (GB)

(73) Assignee: Goodrich Actuation Systems Limited (GB)

( * ) Notice: Subject to any disclaimer, the term of this patent is extended or adjusted under 35 U.S.C. 154(b) by 39 days.

(21) Appl. No.: 12/568,157

(22) Filed: Sep. 28, 2009

(65) Prior Publication Data
US 2010/0077879 A1    Apr. 1, 2010

(30) Foreign Application Priority Data

Sep. 29, 2008   (GB) .................................. 0817775.0
Nov. 27, 2008  (GB) .................................. 0821678.0

(51) Int. Cl.
*F16H 25/20*      (2006.01)
(52) U.S. Cl. ...................... 74/89.39; 74/89.37
(58) Field of Classification Search ............... 74/89.23, 74/89.38, 89.39, 89.37
See application file for complete search history.

(56) References Cited

U.S. PATENT DOCUMENTS

| 4,603,594 | A | * | 8/1986 | Grimm | 74/89.39 |
|---|---|---|---|---|---|
| 5,345,835 | A | * | 9/1994 | Schabert et al. | 74/89.39 |
| 5,398,780 | A | * | 3/1995 | Althof et al. | 185/39 |
| 5,467,661 | A | * | 11/1995 | Lange | 74/441 |
| 5,778,733 | A | | 7/1998 | Stringer | |
| 2005/0155444 | A1 | | 7/2005 | Otaki et al. | |
| 2007/0220998 | A1 | * | 9/2007 | Kopecek | 74/89.39 |

FOREIGN PATENT DOCUMENTS

EP    2048414    4/2009
GB    2 435 877    9/2009

OTHER PUBLICATIONS

European Search Report dated Jan. 28, 2010.

* cited by examiner

*Primary Examiner* — Richard W Ridley
*Assistant Examiner* — Terence Boes
(74) *Attorney, Agent, or Firm* — Andrus, Sceales, Starke & Sawall, LLP

(57) ABSTRACT

An actuator is described which comprises a rotatable actuator member (14, 114) and a lock arrangement (28, 128) operable to lock the actuator member (14, 144) against rotation, the lock arrangement (28, 128) comprising an axially movable lock member (30, 130, 230a, 230b), the lock member being movable between a locked position in which it co-operates with a stop (34, 136) to resist rotation of the actuator member, and a released position, and an actuation device (62, 162) operable to move the lock member towards its released position.

9 Claims, 9 Drawing Sheets

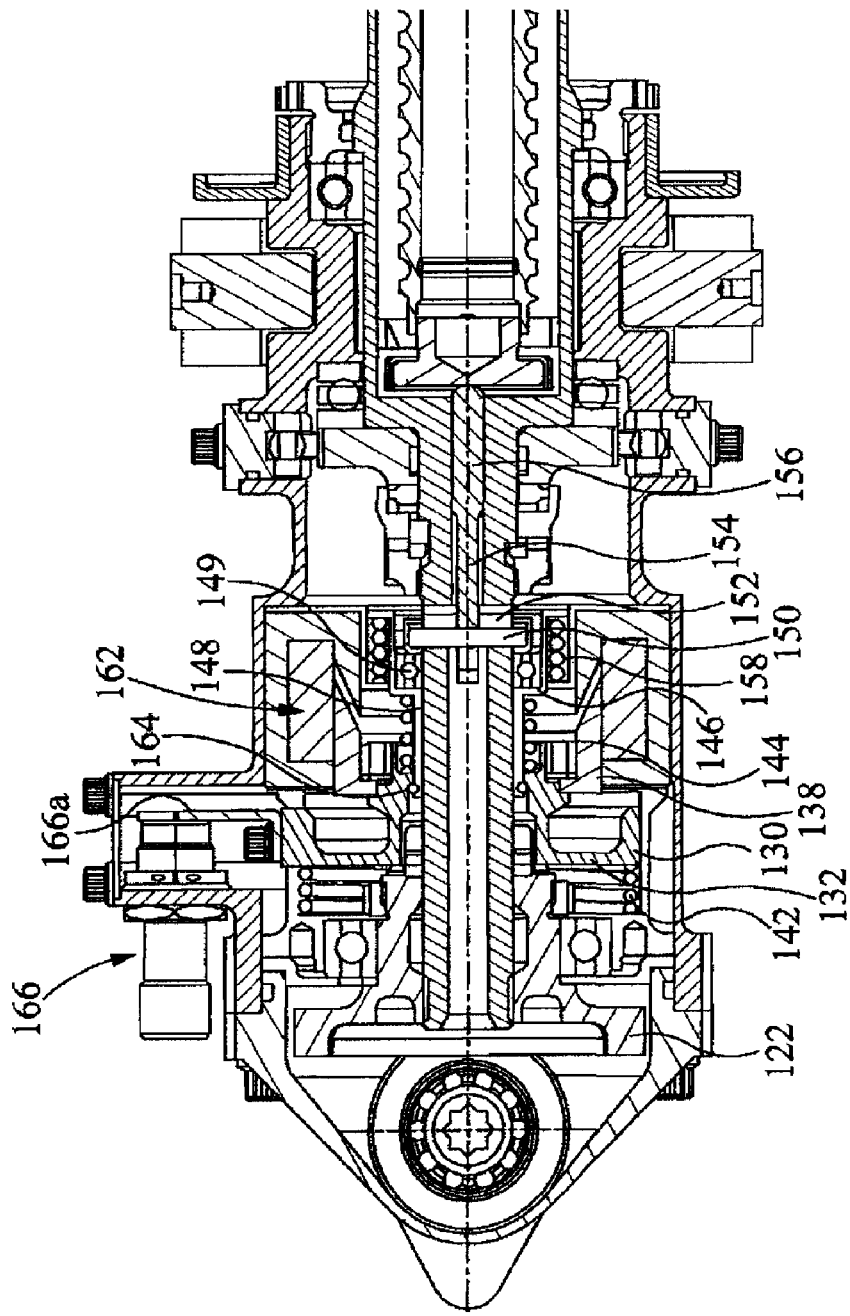
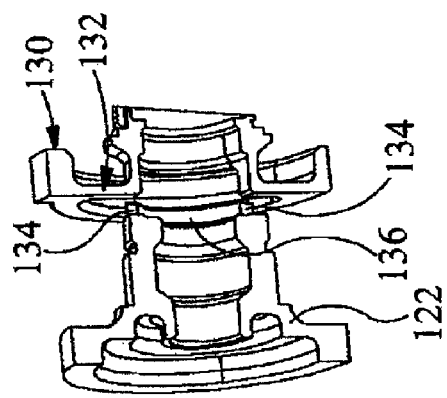
Figure 6
Figure 7

ACTUATOR

BACKGROUND OF THE INVENTION

This invention relates to an actuator, and in particular to an actuator suitable for use in aerospace applications for use in driving a moveable component between stowed and deployed positions. The invention is particularly applicable to an actuator of the type in which a lock arrangement is provided to resist extension thereof when this is not desired, for example an actuator suitable for use in controlling the deployment of thrust reverser cowls or the like. However, it will be appreciated that the actuator may be used in other applications.

In some applications, as mentioned above, it is important to be able to lock an actuator against movement in order to guard against movement of an associated moveable component other than when required. For example it is important to be able to lock the actuators associated with parts of a thrust reverser system against movement, the lock arrangements used to guard against movement of the moveable component being releaseable under the control of the thrust reverser control system or part of an associated engine control unit when deployment of the moveable component is required. The manner in which the actuator is locked against movement is preferably such that unwanted extension of the actuator either due to the application of external loadings or by the application of drive power to the actuator at times other than when desired is prevented.

One type of actuator commonly used in this type of application comprises a rotatable screw shaft with which a nut cooperates through the intermediary of a ball or roller screw coupling, the nut being held against rotation, for example by virtue of the manner in which it is secured to the moveable component. In use a motor, for example an electrically powered motor, is used to drive the screw shaft for rotation. The rotation of the screw shaft results in axial displacement of the nut, driving the moveable component for movement. The direction of movement of the moveable component is dependent upon the direction of rotation of the screw shaft.

In order to guard against deployment of the moveable component other than when desired it is known to provide a lock arrangement including a lock sleeve which can directly engage the nut. An actuator arrangement, for example in the form of a solenoid actuator, is provided to move the lock sleeve. Arrangements of this type are described in, for example, EP 2048414.

In such arrangements, the nut and lock sleeve are often exposed to environmental conditions which can result in contamination and/or icing that may impede the movement of the lock sleeve, and thereby interfere with the operation of the actuator. In order to overcome icing problems, it may be required to use a solenoid actuator arrangement of greater power than would otherwise be required to ensure that the lock sleeve can still be driven for movement, even when ice formation is impeding such movement. As solenoid actuators of increased power are typically also of increased weight, it will be appreciated that such a solution carries a weight penalty and so is undesirable.

SUMMARY OF THE INVENTION

It is an object of the invention to provide an actuator of relatively simple and convenient form and suitable for use in such applications.

According to the present invention there is provided an actuator comprising a rotatable actuator member and a lock arrangement operable to lock the actuator member against rotation, the lock arrangement comprising an axially movable lock member, the lock member being movable between a locked position in which it co-operates with a stop to resist rotation of the actuator member, and a released position, and an actuation device operable to move the lock member towards its released position.

Such an arrangement permits the provision of locking functionality in a relatively simple manner.

The actuator member may comprise a nut, or a rotary shaft, or other component associated with a nut, the nut co-operating with an output shaft to drive the output shaft for axial movement upon rotation of the nut. Alternatively, the actuator member may comprise a rotatable shaft, rotation of which drives a nut for axial movement.

The lock member may be held against rotation, and be co-operable with a stop provided on or associated with the actuator member when in its locked position.

Alternatively, the lock member may be rotatable with the actuator member and be arranged to co-operate with a fixed stop.

Preferably, a release spring is provided which urges the lock member towards its released position, and a lock spring is provided which urges the lock member towards its locked position, the lock spring preferably also engaging a movable stop or abutment, movable to vary the spring loading applied to the lock member. By appropriate control over the position of the movable abutment, it will be appreciated that the lock member may either be biased towards its locked position, or may be biased away therefrom. Such an arrangement is advantageous in that, once the lock arrangement has been released and movement of the actuator member has commenced, appropriate control over the position of the movable abutment allows the associated actuation device to be de-energised, resulting in savings in power consumption, without resulting in the lock member returning or being biased towards its locked position.

The lock member may include an outer component engaged by one of the release and lock springs, and an inner component engaged by the other of the release and lock springs. A releasable drive coupling maybe provided between the lock member and the actuation device. The releasable drive coupling may be arranged to become released in the event of relative movement occurring between the inner and outer components.

The movable abutment is preferably spring biased by a pusher spring. Preferably, when the actuator occupies a retracted position, the movable abutment is held, for example by a plunger, in a first position in which the net spring force applied by the release and lock springs urges the lock member towards its locked position, movement of the actuator away from this position permitting movement of the movable abutment to a second position in which the spring force applied by the lock spring is reduced. The pusher spring is preferably of high spring force.

In one arrangement, a seal may be provided between the moveable stop and the screw shaft to resist the ingress of contamination therebetween. The actuator conveniently includes an actuator housing from which the screw shaft and moveable stop project, a seal preferably being provided between the moveable stop and the housing to resist the ingress of contamination therebetween. However, where a plunger is provided as mentioned hereinbefore then the use of such seals may be avoided.

BRIEF DESCRIPTION OF THE DRAWINGS

The invention will further be described, by way of example, with reference to the accompanying drawings, in which:

FIG. 6 is a view to an enlarged scale illustrating part of the actuator of FIG. 5;

FIG. 7 is a diagram illustrating part of the actuator;

DETAILED DESCRIPTION OF THE PREFERRED EMBODIMENTS

Figure 1:
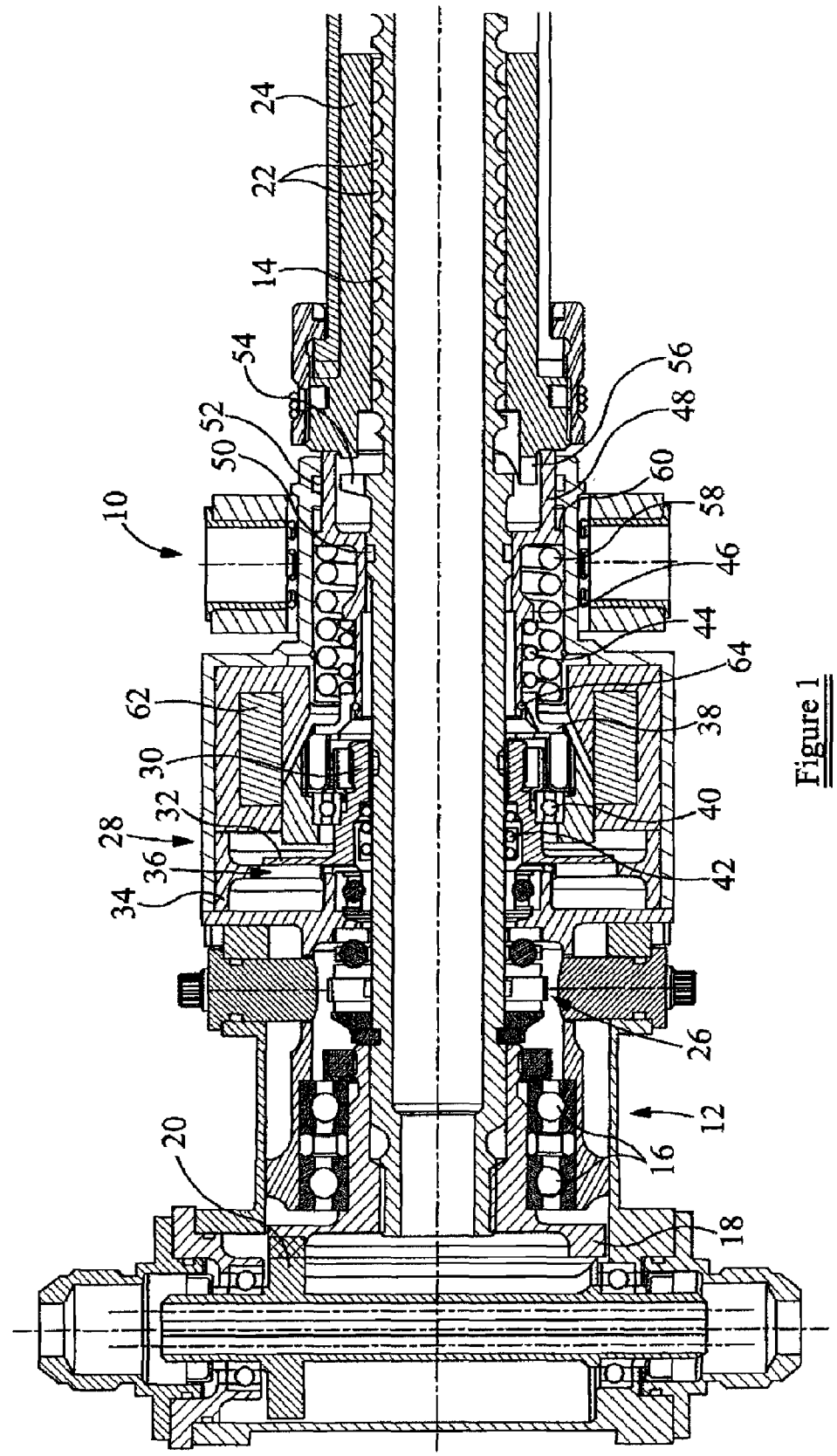
FIG. 1 is a cross-sectional view illustrating part of an actuator in accordance with one embodiment of the invention.
Figure 2:
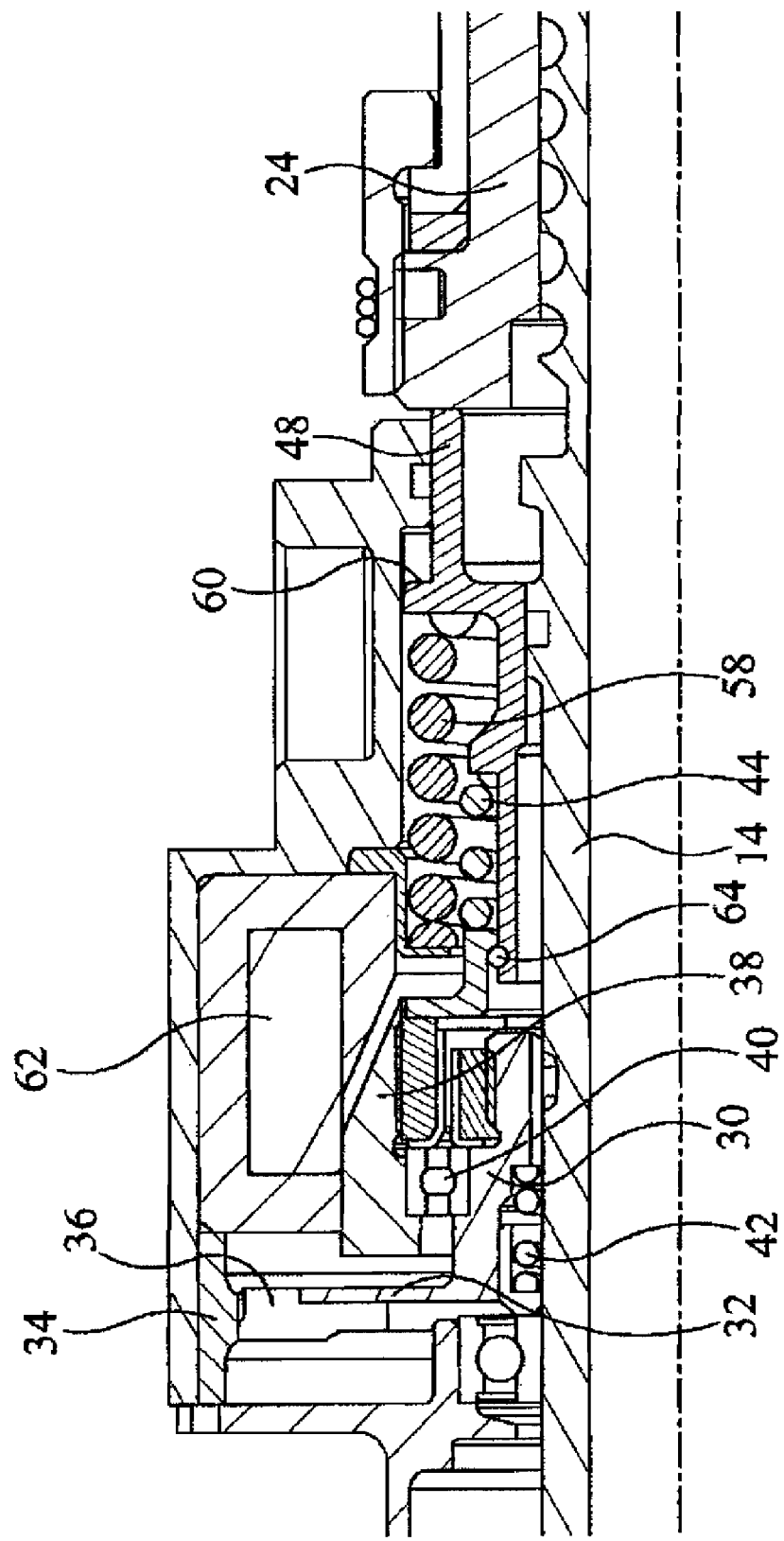
FIGS. 2, 3 and 4 are cross-sectional views illustrating part of the actuator of FIG. 1 in various operating positions.

Referring to FIGS. 1 to 4 of the accompanying drawings there is illustrated an actuator 10 intended for use in driving a moveable component of a thrust reverser, for example a cowl thereof, between a stowed position and a deployed position. Although only a single actuator 10 is illustrated, in practice several such actuators will typically be provided, the actuators 10 usually being driven by a common drive motor, for example in the form of an electric motor. Flexible drive shafts may to be use transmit drive to the actuators 10.

The actuator 10 comprises a multi part housing 12 within which an actuator member in the form of a screw shaft 14 is supported for rotation by bearings 16. The nature of the bearings 16 is such that the screw shaft is capable of rotating but is held against significant axial movement. At one end, the screw shaft 14 carries a face gear 18 which meshes with an input gear 20 driven, in use, by the associated flexible drive shaft (not shown) which, in turn, is driven by the electric motor.

The screw shaft 14 projects from the housing 12, and the part of the shaft 14 located outside of the housing 12 is provided with screw formations 22. Rollers or balls (not shown) are located within the screw formations 22 and within corresponding formations (not shown) provided in a nut 24 to form a ball or roller screw coupling between the screw shaft 14 and the nut 24. The nut 24 is mounted, via a gimbal mounting (not shown), to the moveable component, the nature of the mounting being such that the nut 24 is held against rotary motion. The nature of the ball or roller screw coupling is such that, in use, rotation of the screw shaft 14 under the control of the motor causes the nut 24 to translate along the screw shaft 14, the translation being transmitted to the moveable component, causing movement thereof between its stowed and deployed positions. The direction in which the moveable component is driven depends upon the direction of rotary movement of the screw shaft 14 and motor.

A no-back arrangement 26 of conventional form is provided within the housing 12 around part of the screw shaft 14, and serves to prevent or restrict externally applied loadings being transmitted back through the drive train during deployment or stowing operations.

In accordance with the invention a lock arrangement 28 is provided to permit the screw shaft 14 to be locked against rotation, thereby locking the actuator 10 against extension, and so locking the moveable component of the thrust reverser against deployment. The lock arrangement 28 comprises a tubular lock member 30 which extends around and is splined to the screw shaft 14 by a roller or ball spline arrangement so as to be rotatable with the screw shaft 14 whilst permitting limited axial movement of the lock member 30 relative to the screw shaft 14 in a low friction manner. The lock member 30 includes an outwardly projecting flange 32 of non-circular shape. The housing 12, adjacent the lock member 30, includes a fixed stop or abutment region 34 having an opening 36 of shape similar to that of the flange 32. The arrangement is such that, in use, if the lock member 30 occupies a locked position in which the flange 32 thereof is received within the opening 36 of the fixed abutment region 34, the cooperation between the lock member 30 and the abutment region 34 serves to resist rotation of the lock member 30. As the lock member 30 is splined to the screw shaft 14, rotation of the screw shaft 14 is also resisted. Axial movement of the lock member 30 to a released position in which the flange 32 thereof is no longer located within the abutment region 34 frees the lock member 30, and hence the screw shaft 14, for rotation.

The lock member 30 is coupled to a non-rotating armature 38, through a bearing 40. A release spring 42 is engaged between the lock member 30 and a shoulder provided on the screw shaft 14, the release spring 42 applying a spring force to the lock member 30 urging the lock member 30 towards its released position. A lock spring 44 is engaged between the armature 38 and a shoulder 46 provided on a moveable abutment or stop 48, the lock spring 44 applying a spring force to the armature 38 urging the lock member 30 towards its locked position. The magnitude of the spring force applied by the lock spring 44 is dependent upon the position occupied by the moveable stop 48. Depending upon the position occupied by the moveable stop 48, the spring force applied by the lock spring 44 may be either greater than or less than that applied by the release spring 42, thus it will be appreciated that the net spring force applied to the lock member 30 may either bias the lock member 30 towards its locked position or towards its released position, depending upon the position of the moveable stop 48.

The moveable stop 48 is of tubular form, extending around part of the screw shaft 14, and projecting from the housing 12. Seals 50, 52 are formed between the moveable stop 48 and both the screw shaft 14 and the housing 12, thus preventing or restricting the ingress of contaminants into the housing 12. The projecting part of the moveable stop 48 is arranged to abut the nut 24 when the nut 24 approaches its fully retracted position, subsequent movement of the nut 24 to its fully retracted position, in which claw stops 54, 56 provided on the nut 24 and screw shaft 14 abut one another, causing axial movement of the moveable stop 48 compressing a pusher spring 58 engaged between the moveable stop 48 and part of the housing 12. Initial movement of the nut 24 away from the fully retracted position is accompanied, by virtue of the action of the pusher spring 58, by axial movement of the moveable stop 48 from a first position to a second position in which a shoulder 60 provided on the moveable stop 48 abuts a part of the housing 12. The pusher spring 58 is of high spring rate, thus ensuring that movement of the moveable stop 48 will occur, even in the event of ice or other contaminants resisting such movement.

An actuating device in the form of a solenoid winding 62 is located within the housing 12 and arranged such that energisation thereof urges the armature 38 for axial movement, moving the lock member 30 towards its released position.

Figure 3:
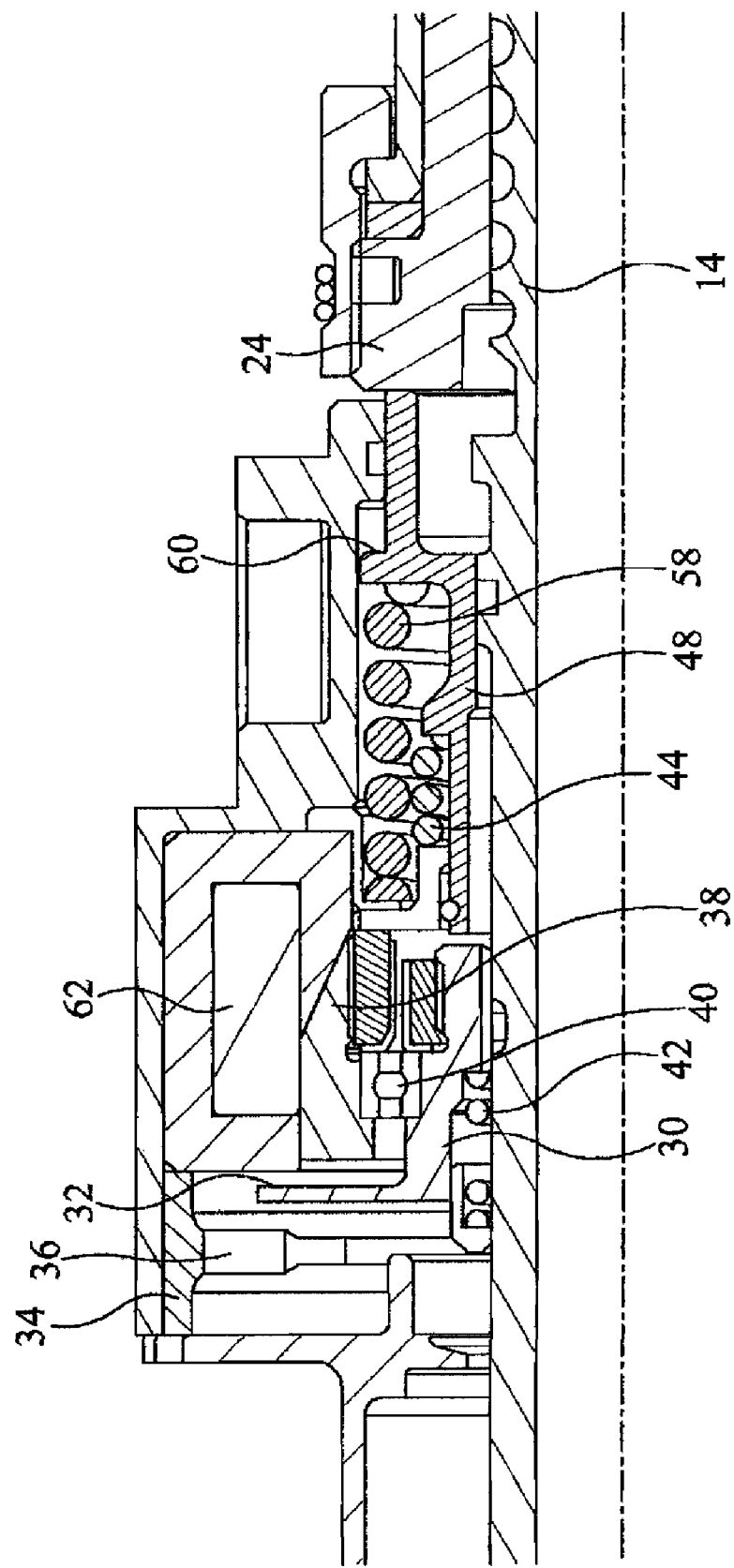
Figure 4:
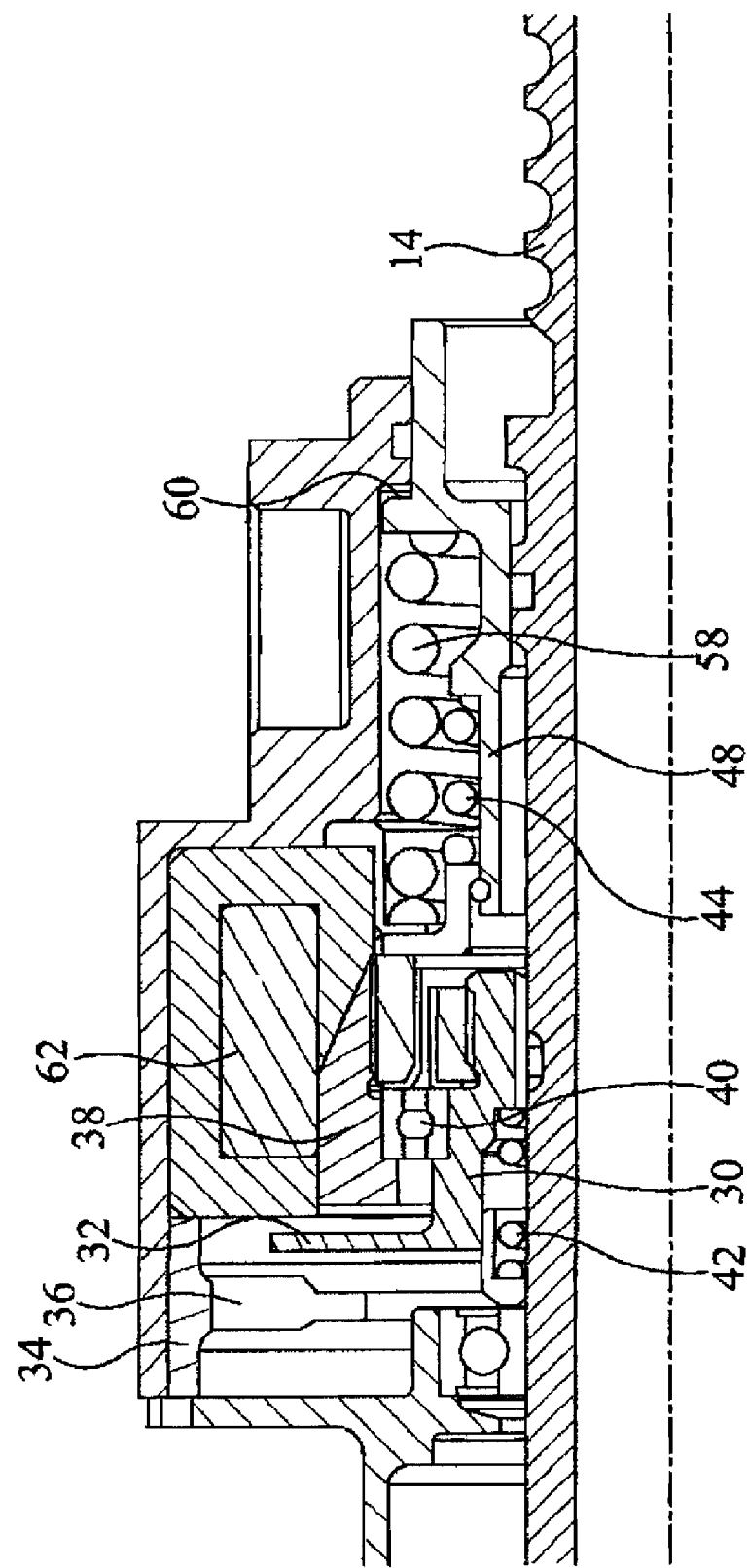

In use, starting from the fully retracted, locked position (shown in FIG. 2), when it is desired to deploy the moveable component the associated control arrangement, for example part of a thrust reverser control unit or part of the engine or aircraft control unit, instructs the lock arrangement 28 to release, and this is achieved by energising the solenoid winding 62. Such energisation results in the lock member 30 being moved to the released position against the net biasing force applied by the release and lock springs 42, 44. This position is shown in FIG. 3. Once in its released position, the lock member 30 no longer resists rotation of the screw shaft 14, thus operation of the motor can be used to drive the actuator 10 from the fully retracted position towards an extended position. As mentioned hereinbefore, the initial part of this movement is accompanied by movement of the moveable stop 48 by virtue of the spring biasing thereof from its first position to its second position. The movement of the moveable stop 48 serves to reduce the magnitude of the spring force applied to the lock member 30 by the lock spring 44 to a point at which the release spring 42 is able to hold the lock member 30 in the released position against the action of the lock spring 44. This position is shown in FIG. 4. Once this position has been reached it will be appreciated that the winding 62 can be deenergised without resulting in the lock member 30 returning towards its locked position. Consequently, power consumption savings can be made as the winding 62 does not need to remain energised throughout the period in which the actuator 10 is extended, without the risk of reengagement of the lock arrangement, and the associated risk of damage to the actuator.

When the actuator 10 is retracted to return the moveable component to its stowed position, the motor is used to drive the screw shaft 14 and nut 24 for retracting movement. As the nut 24 approaches its fully retracted position, the nut 24 moves into engagement with the moveable stop 48, further movement of the nut 24 moving the moveable stop 48 against the action of the pusher spring 58 from its second position back to the first position. The movement of the moveable stop 48 increases the magnitude of the spring loading applied to the lock member 30 by the lock spring 44 to a point at which the lock member 30 is biased towards the locked position. Until the nut 24 reaches its fully retracted position, the angular position of the lock member 30 may be such that it cannot actually move into its locked position, but once the nut 24, and consequently the screw shaft 14, reaches its fully retracted position the lock member 30 will snap into its locked position, whereon it cooperates with the abutment region 34 to resist rotation of the screw shaft 14, and thus locks the actuator against extension. It will be appreciated that during this phase in the operation of the actuator some relative movement will occur between the moveable stop 48 and the lock member 30/armature 38. These components are able to slide relative to one another to accommodate this, a spring clip 64 serving to limit the range of relative movement.

Conveniently, a position sensor is associated with the lock member 30 to provide an indication of the position thereof for use by the associated control arrangement. For example, an inductive proximity sensor may be provided to detect when the lock member 30 occupies its locked position.

It will be appreciated that such an arrangement provides a relatively simple technique for locking an actuator against movement, and for reducing the risk of ice or other contaminants impeding operation. Power consumption savings can be made through only requiring the actuator device to be energised for a short period of time. It will further be noted that the actuator device does not need to be energised during retraction of the actuator, the spring loadings automatically achieving locking of the actuator in its fully retracted position. The actuating device can be of relatively low power and weight as it only needs to be able to overcome the relatively light net spring force applied by the release and lock springs 42, 44, not the larger load applied by the pusher spring which is sized to allow it to move the moveable stop even in the event of ice or other contaminants interfering with movement thereof.

Figure 5:
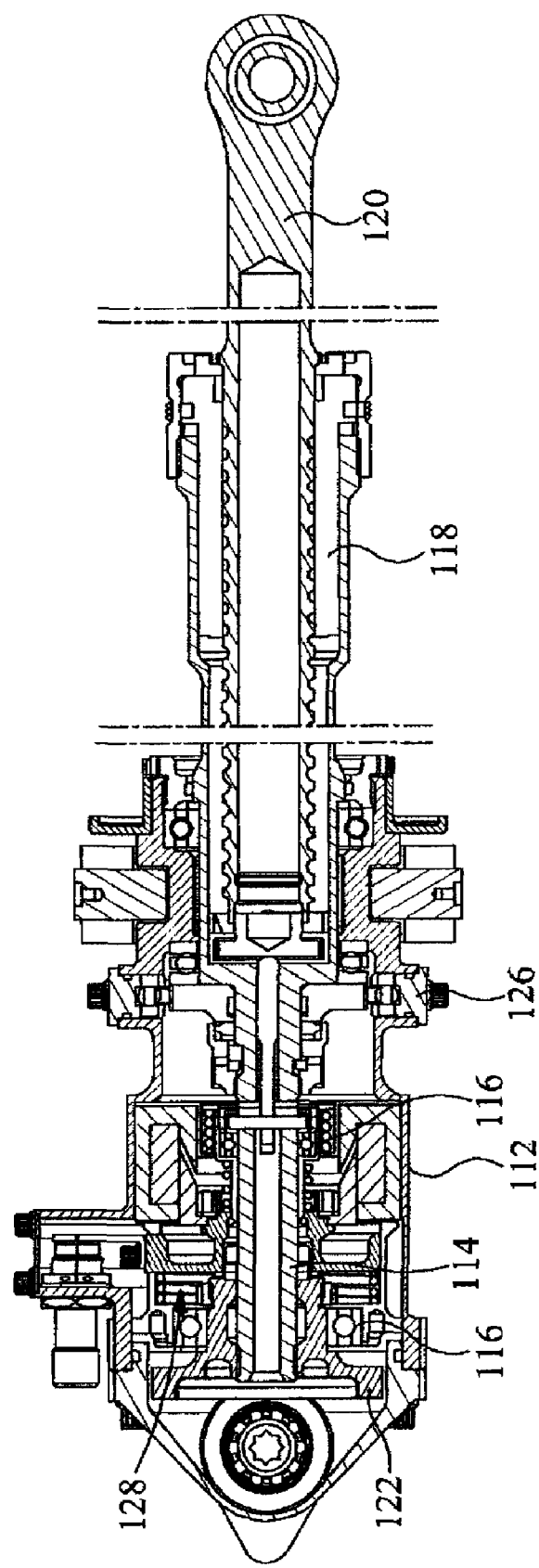
FIG. 5 is a sectional view of an actuator in accordance with another embodiment of the invention.

An alternative design of actuator is illustrated in FIGS. 5 to 7 of the accompanying drawings and comprises a multi-part housing 112 within which a rotatable actuator member 114 is supported for rotation by bearings 116. The actuator member 114 takes the form of a shaft, part of which is hollow and within which a nut 118 is secured, the nut 118 co-operating with screw-thread formations formed on an output shaft 120 through a ball or roller screw-coupling. The actuator member 114 is held against axial movement, and the mounting of the output shaft 120 to a component to be moved is arranged such that rotation thereof is resisted. Consequently, it will be appreciated that rotation of the actuator member 114 results in the output shaft 120 being driven for axial movement thereby deploying or retracting a component, for example part of a thrust reverser system, secured thereto.

Splined to one end of the actuator member 114 is an input drive gear 122 in the form of a face gear arranged to be driven for rotation through an appropriate drive mechanism.

A no-back arrangement 126 of conventional form is provided within the housing 112 around part of the actuator member 114, and serves to prevent or restrict externally applied loadings being transmitted back through the drive train during deployment or stowing operations.

In accordance with the invention a lock arrangement 128 is provided to permit the actuator member 114 to be locked against rotation, thereby locking the actuator against extension, and so locking the movable component of the thrust reverser against deployment. The lock arrangement 128 comprises an axially movable lock member 130 which extends around the actuator member 114 and is splined to part of the housing 112 by a roller or ball spline arrangement so as to be fixed against rotation whilst permitting limited axial movement of the lock member 130 relative to the housing 112 and actuator member 114 in a low friction mariner. The lock member 130 includes a pair of radially extending flanges 132. The flanges 132 are engageable with stop surfaces 134 defined by stops 136 formed on a facing surface of the gear 122. The arrangement is such that, in use, if the lock member 130 occupies a locked position in which the flanges 132 thereof engage the stop surfaces 134, the co-operation between the lock member 130 and the gear 122 serves to resist rotation of the gear 122 and hence the actuator member 114. Axial movement of the lock member 130 to a released position in which the flanges 132 thereof no longer engage the stop surfaces 134 frees the actuator member 114, for rotation.

The lock member 130 is coupled to a non-rotating armature 138. A release spring 142 is engaged between the lock member 130 and a shoulder provided on the housing 112, the release spring 142 applying a spring force to the lock member 130 urging the lock member 130 towards its released position. A lock spring 144 is engaged between the lock member 130 and a shoulder 146 provided on a movable abutment 148, the lock spring 144 applying a spring force to the lock member 130 urging the lock member 130 towards its locked position. As with the arrangement described hereinbefore, the magnitude of the spring force applied by the lock spring 144 is dependent upon the position occupied by the movable abutment 148. Depending upon the position occupied by the movable abutment 148, the spring force applied by the lock spring 144 may be either greater than or less than that applied by the release spring 142, thus it will be appreciated that the net spring force applied to the lock member 130 may either bias the lock member 130 towards its locked position or towards its released position, depending upon the position of the movable abutment 148.

The movable abutment 148 is of tubular form, extending around part of the actuator member 114, but differs from the arrangement described hereinbefore in that the abutment 148 is coupled, via a bearing 149 to a diametrically extending pin 150 passing through slots 152 formed in the actuator member 114, to a plunger 154 located within a bore 156 formed in the actuator member 114, an end part of the plunger 154 projecting from the bore 156 and being engageable with the output shaft 120 when the output shaft 120 is in or close to its fully retracted position. A pusher spring 158 bears against part of the movable abutment 148, urging the movable abutment 148 and plunger 156 to the right in the orientation illustrated. When in the fully retracted position, the co-operation between the output shaft 120 and the plunger 156 results in the movable abutment 148 being moved to the left, increasing the spring loading applied by the lock spring 144 with the result that the lock member 130 is biased towards its locked position. Initial movement of the output shaft 120 is accompanied by movement of the plunger 156 and movable abutment 148 due to the action of the pusher spring 158, reducing the spring loading applied by the lock spring 144 with the result that the lock member 130 is biased towards its released position.

The pusher spring 158 is of high spring rate, thus ensuring that movement of the moveable abutment 148 will occur, even in the event of ice or other contaminants resisting such movement.

An actuating device in the form of a solenoid winding 162 is located within the housing 112 and arranged such that energisation thereof urges the armature 138 for axial movement, moving the lock member 130 towards its released position.

Operation is very similar to the arrangement described hereinbefore. In use, starting from the fully retracted, locked position, when it is desired to extend the actuator the associated control arrangement, for example part of a thrust reverser control unit or part of the engine or aircraft control unit, instructs the lock arrangement 128 to release, and this is achieved by energising the solenoid winding 162. Such energisation results in the lock member 130 being moved to the released position against the net biasing force applied by the release and lock springs 142, 144. Once in its released position, the lock member 130 no longer resists rotation of the actuator member 114, thus operation of the motor can be used to drive the actuator from the fully retracted position towards an extended position. As mentioned hereinbefore, the initial part of this movement is accompanied by movement of the movable abutment 148 by virtue of the spring biasing thereof. The movement of the movable abutment 148 serves to reduce the magnitude of the spring force applied to the lock member 130 by the lock spring 144 to a point at which the release spring 142 is able to hold the lock member 130 in the released position against the action of the lock spring 144. Once this position has been reached it will be appreciated that the winding 162 can be de-energised without resulting in the lock member 130 returning towards its locked position. Consequently, power consumption savings can be made as the winding 162 does not need to remain energised throughout the period in which the actuator is extended, without the risk of re-engagement of the lock arrangement, and the associated risk of damage to the actuator.

When the actuator is retracted to return the movable component to its stowed position, the motor is used to drive the actuator member 114 and nut 118 for retracting movement. As the output shaft 120 approaches its fully retracted position, the shaft 120 moves into engagement with the plunger 156, further movement of the shaft 120 moving the movable abutment 148 against the action of the pusher spring 158. The movement of the movable abutment 148 increases the magnitude of the spring loading applied to the lock member 130 by the lock spring 144 to a point at which the lock member 130 is biased towards the locked position. Until the shaft 120 reaches its fully retracted position, the angular position of the gear 122 may be such that the lock member 130 cannot actually move into its locked position, but once the fully retracted position is reached the lock member 130 will snap into its locked position, whereon it co-operates with the stop surfaces 134 to resist rotation of the actuator member 114, and thus locks the actuator against extension. It will be appreciated that during this phase in the operation of the actuator some relative movement will occur between the movable abutment 148 and the lock member 130/armature 138. These components are able to slide relative to one another to accommodate this, a spring clip 164 serving to limit the range of relative movement.

Conveniently, a position sensor 166 is associated with the lock member 130 to provide an indication of the position thereof for use by the associated control arrangement. For example, an inductive proximity sensor may be provided to detect a flange or target 166a mounted to the lock member 130, to indicate when the lock member 130 occupies its locked position. Additionally or alternatively, a window or opening may be provided in the housing 112 adjacent the lock member 130 to allow for visual inspection of the position of the lock member 130.

The advantages of the arrangement described hereinbefore are equally applicable to this arrangement.

To allow for manual unlocking of the actuator for maintenance or servicing operations, an externally accessible crank may be provided to displace the lock member 130 against the action of the lock spring 144, thus releasing the actuator member for rotation.

It will be appreciated that in most respects the arrangement of FIGS. 5 to 7 is very similar to, and operation is substantially the same as, that of FIGS. 1 to 4. The main differences are that in the actuator of FIGS. 5 to 7 is of the type in which the nut, rather than the shaft, rotates, in use, and in that the lock component is non-rotating, in use, whereas that of FIGS. 1 to 4 is rotatable with the shaft.

Figure 8:
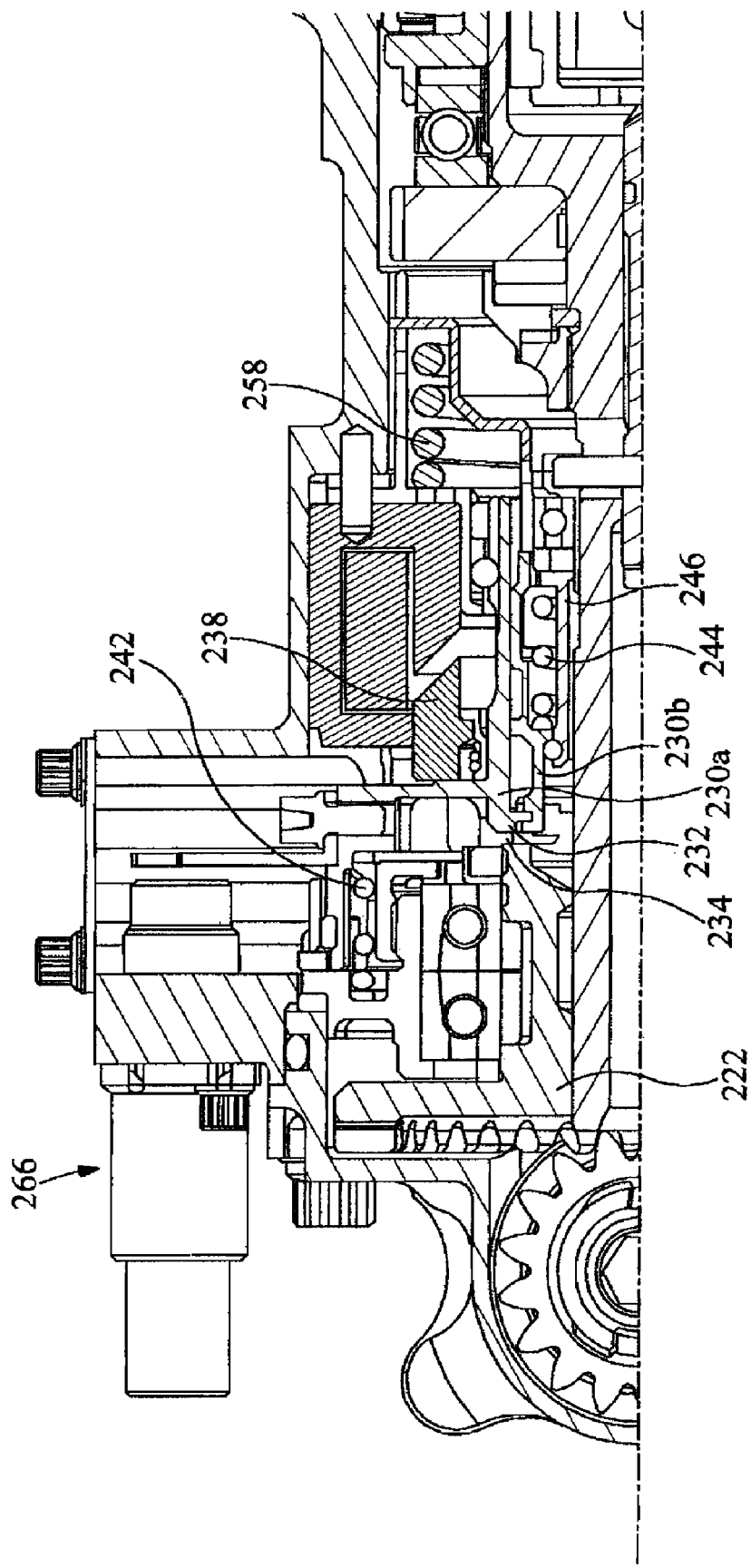
FIGS. 8 and 9 are two sectional views, one angled to the other, of part of a modification to the arrangement of FIGS. 5 to 7.
Figure 9:
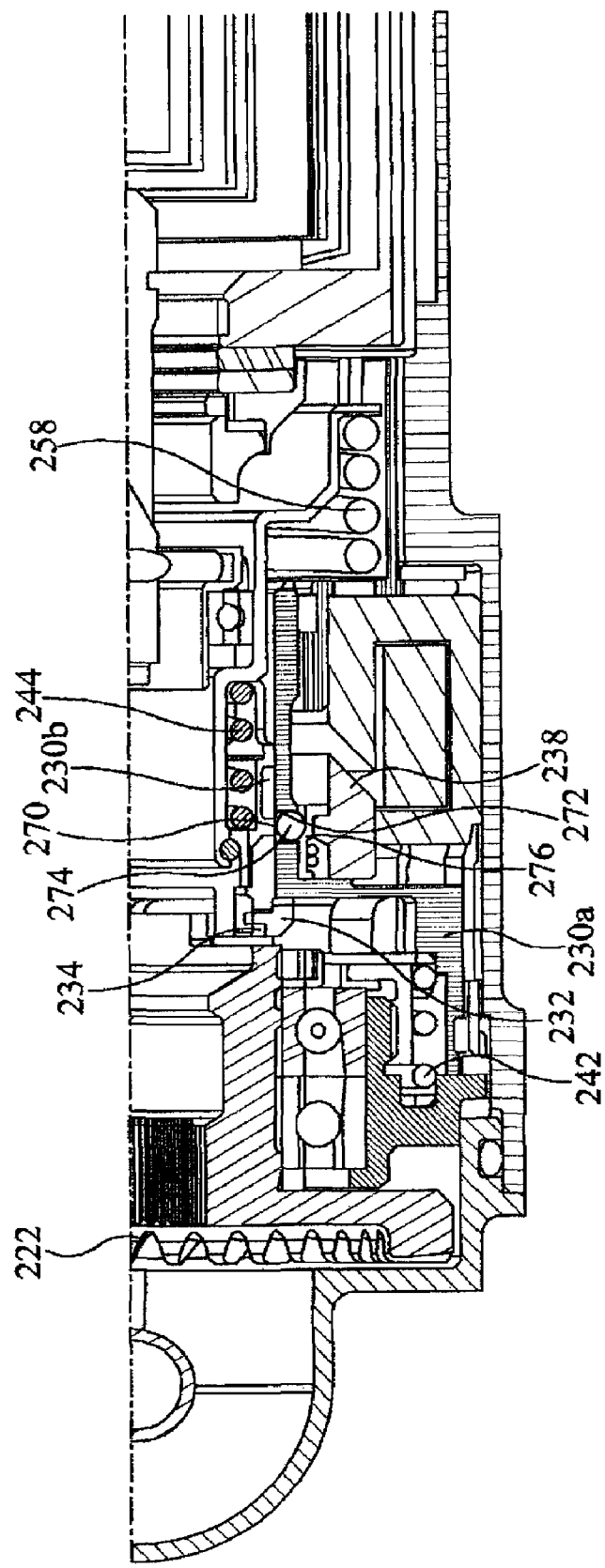
Figure 10:
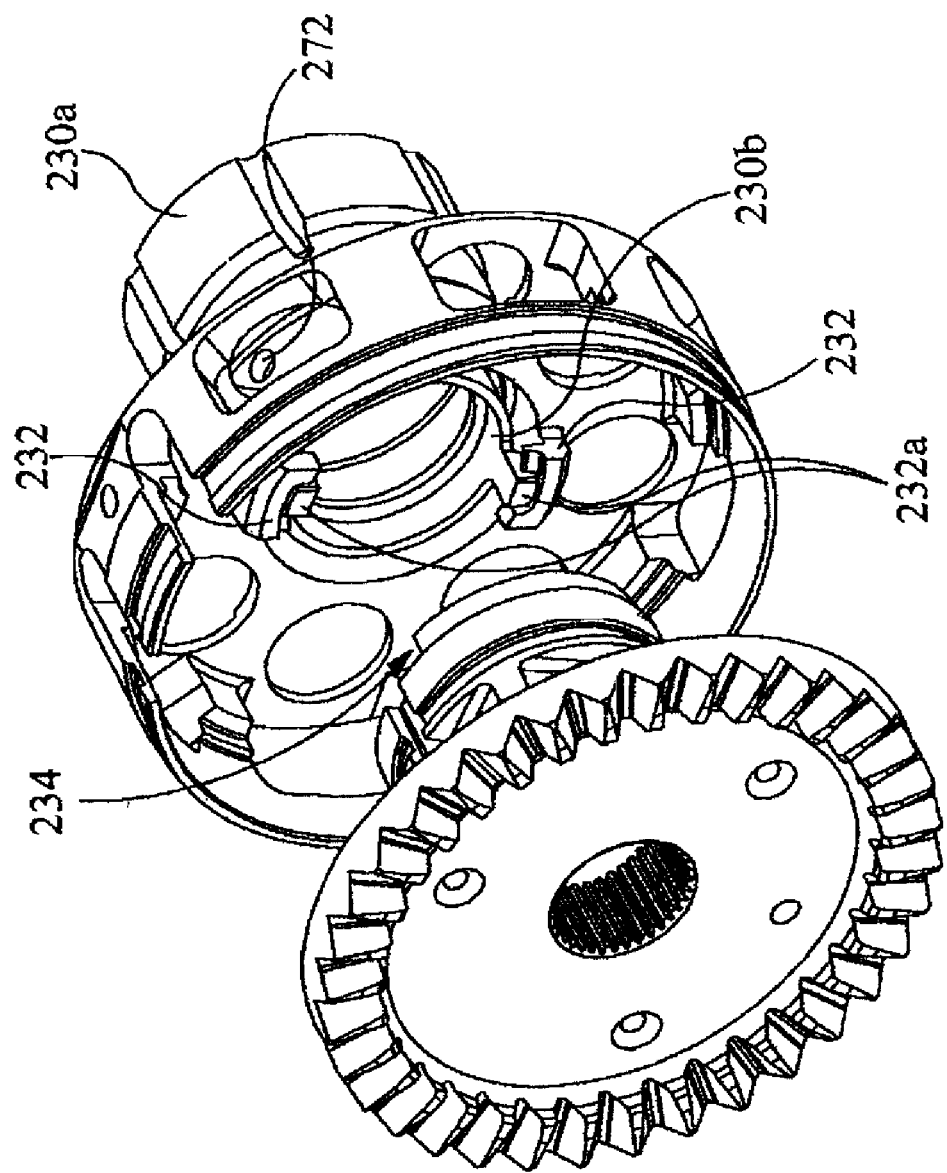
FIG. 10 is an exploded perspective view illustrating part of the arrangement of FIGS. 8 and 9.

In the arrangement of FIGS. 5 to 7, a failure of one or more of the flanges 132 could result in the position sensor 166 being unable to sense movement of or the position of the lock member 130 with the result that the position sensor 166 may output a signal indicating that the lock arrangement 128 is locked when in fact it is released, and vice versa. Depending upon the nature of the failure, it is possible that the position sensor 166 will continue to provide a correct output, giving the misleading impression that the lock arrangement 128 is operating correctly when in fact some maintenance work is required. FIGS. 8 to 10 illustrate a modification in which this risk is reduced. Similar reference numerals are used in FIGS. 8 to 10 to denote similar parts to the arrangement of FIGS. 5 to 7.

In the arrangement of FIGS. 8 to 10 the lock member 130 is modified to be of two-part form comprising an outer component 230a including abutment lugs 232 arranged to engage, in use, the stop surfaces 234 associated with the gear 222, and an inner sleeve 230b. The inner sleeve 230b and outer component 230a are coupled to one another by the lugs 232 and coupling features 232a of the inner sleeve 230b which co-operate with one another in a bayonet-type manner as best shown in FIG. 10. The release spring 242 bears against part of the outer component 230a whilst the lock spring 244 acts against part of the inner sleeve 230b.

The inner sleeve 230b includes an outwardly extending flange 270 which is aligned, in use, with a series of angularly spaced openings 272 (see FIG. 9) provided in the outer component 230a. The openings 272 each contain a retaining member in the form of a ball 274, the flange 270 preventing inward movement of the balls 274. The balls 274 each project radially outwardly of the openings 272 and serve to hold a collar 276 captive to the outer component 230a, and thereby secure the armature 238 to the outer component 230a.

In normal use, the outer component 230a and inner sleeve 230b are secured to one another and the actuator and lock arrangement operate in a manner very similar to that described hereinbefore with reference to FIGS. 5 to 7.

The parts of the lock arrangement most susceptible to damage are the abutment lugs 232. In the event of a failure of the abutment lugs 232, it will be appreciated that the inner sleeve 230b and outer component 230a will no longer be rigidly secured to one another but rather some relative movement may occur therebetween. The biasing of the outer component 230a by the release spring 242 and of the inner sleeve 230b by the lock spring 244 results in such relative movement occurring. The movement results in the flange 270 moving out of alignment with the openings 272, and as a consequence the balls 274 no longer retain the collar 276 in position. The drive connection between the armature 238 and the outer component 230a is thus broken.

It will be appreciated that, in such an arrangement, the failure results in the lock arrangement becoming released, the position sensor 266 correctly indicating that the lock arrangement is released, irrespective of the operating position of the armature 238, and in drive to the outer component 230a being broken. The position sensor 266 will continue to indicate, correctly, that the lock arrangement is released until such time as the lock arrangement is repaired.

A number of other modifications and alterations may be made to the arrangements described hereinbefore without departing from the scope of the invention.

The invention claimed is:

1. An actuator comprising a rotatable actuator member (14, 114) and a lock arrangement (28, 128) operable to lock the actuator member (14, 114) against rotation, the lock arrangement (28, 128) comprising an axially movable lock member (30, 130, 230a, 230b), the lock member being movable between a locked position in which it co-operates with a stop (34, 134) to resist rotation of the actuator member (14, 114), and a released position, and an actuation device (62, 162) operable to move the lock member (30, 130, 230a, 230b) towards its released position, a release spring (42, 142, 242) is provided which urges the lock member (30, 130, 230a, 230b) towards its released position, and a lock spring (44, 144, 244) is provided which urges the lock member (30, 130, 230a, 230b) towards its locked position, the lock spring (44, 144, 244) engages a movable stop or abutment (48, 148, 248), movable to vary the spring loading applied to the lock member (30, 130, 230a, 230b), and wherein the movable abutment (48, 148, 248) is spring biased by a pusher spring (58, 158, 258).

2. An arrangement according to claim 1, wherein the actuator member (114) comprises a nut (118), a rotary shaft, or other component associated with the nut, the nut (118) co-operating with an output shaft (120) to drive the output shaft (120) for axial movement upon rotation of the nut (118).

3. An arrangement according to claim 1, wherein the lock member (130, 230a, 230b) is held against rotation, and is co-operable with a stop (136) provided on or associated with the actuator member (114) when in its locked position.

4. An arrangement according to claim 1 wherein when the actuator occupies a retracted position, the movable abutment (48, 148, 248) is held in a first position in which the net spring force applied by the release and lock springs (42, 44, 142, 144, 242, 244) urges the lock member (30, 130, 230a, 230b) towards its locked position, movement of the actuator away from this position permitting movement of the movable abutment (48, 148, 248) to a second position in which the spring force applied by the lock spring (44, 144, 244) is reduced.

5. An arrangement according to claim 1, wherein the actuator member (14) comprises a rotatable shaft (14) and is arranged to co-operate with a fixed stop (34).

6. An arrangement according to claim 1, wherein the lock member (30) is rotatable with the actuator member (14) and is arranged to co-operate with said fixed stop (34).

7. An actuator comprising a rotatable actuator member (14, 114) and a lock arrangement (28, 128) operable to lock the actuator member (14, 114) against rotation, the lock arrangement (28, 128) comprising an axially movable lock member (30, 130, 230a, 230b), the lock member being movable between a locked position in which it co-operates with a stop (34, 134) to resist rotation of the actuator member (14, 114), and a released position, and an actuation device (62, 162) operable to move the lock member (30, 130, 230a, 230b) towards its released position, wherein a release spring (42, 142, 242) is provided which urges the lock member (30, 130, 230a, 230b) towards its released position, and a lock spring (44, 144, 244) is provided which urges the lock member (30, 130, 230a, 230b) towards its locked position, wherein the lock member (230a, 230b) comprises an inner component (230b) biased by one of the release and lock springs (242, 244), and an outer component (230a) biased by the other of the release and lock springs (242, 244), and further comprising a releasable drive coupling whereby the lock component is coupled to part of the actuation device, and wherein the releasable drive coupling comprises a collar (276) retained to the outer component (230a) by a retainer component (274) located within an opening (272) provided in the outer component (230a), and locator means (270) provided on the inner component (230b) serving to locate the retainer component (274) within the opening (272).

8. An arrangement according to claim 7 wherein the releasable drive coupling is adapted to release in the event of relative movement between the inner and outer components (230a, 230b).

9. An arrangement according to claim 7, wherein the retainer component (274) comprises a ball, and the locator means (270) comprises a flange provided on the inner component.

* * * * *